United States Patent
Kadoya et al.

(10) Patent No.: US 12,280,570 B2
(45) Date of Patent: Apr. 22, 2025

(54) LAMINATE

(71) Applicant: TOPPAN INC., Tokyo (JP)

(72) Inventors: Haruna Kadoya, Tokyo (JP); Shigeki Kudo, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/895,327

(22) Filed: Aug. 25, 2022

(65) Prior Publication Data

US 2022/0410547 A1    Dec. 29, 2022

Related U.S. Application Data

(63) Continuation of application No. PCT/JP2021/006124, filed on Feb. 18, 2021.

(30) Foreign Application Priority Data

Feb. 28, 2020    (JP) .................................. 2020-033186

(51) Int. Cl.
*B32B 27/08*    (2006.01)
*B32B 7/022*    (2019.01)
(Continued)

(52) U.S. Cl.
CPC .............. *B32B 27/08* (2013.01); *B32B 7/022* (2019.01); *B32B 7/12* (2013.01); *B32B 27/36* (2013.01); *B32B 2250/02* (2013.01); *B32B 2250/244* (2013.01); *B32B 2255/10* (2013.01); *B32B 2255/20* (2013.01); *B32B 2307/31* (2013.01); *B32B 2307/514* (2013.01); *B32B 2307/582* (2013.01); *B32B 2307/704* (2013.01); *B32B 2307/72* (2013.01); *B32B 2307/7244* (2013.01);
(Continued)

(58) Field of Classification Search
None
See application file for complete search history.

(56) References Cited

U.S. PATENT DOCUMENTS 5,310,787 A * 5/1994 Kutsuwa ................. B32B 15/09
                                                  525/166
5,532,058 A *  7/1996 Rolando ............. C08G 18/831
                                                  428/424.8
(Continued)

FOREIGN PATENT DOCUMENTS

CN    101954771 A  *  1/2011
JP    S63-237927 A   10/1988
(Continued)

OTHER PUBLICATIONS

"Polyesters, Films." Encyclopedia of Polymer Science and Engineering, vol. 12, (1988) (Year: 1988).*
(Continued)

*Primary Examiner* — Vivian Chen
(74) *Attorney, Agent, or Firm* — Foley & Lardner LLP

(57) ABSTRACT

A laminate for forming a packaging bag including a substrate layer containing a crystalline polyester film, an adhesive layer, and a sealant layer containing the polyester film arranged in this order. The sealant layer has a ratio of a fracture elongation thereof to a thickness thereof which is 13%/um or less. The fracture elongation is a fracture elongation of the sealant layer as measured in a unit of 15 mm width thereof in an MD direction.

10 Claims, 1 Drawing Sheet

(51) Int. Cl.
*B32B 7/12* (2006.01)
*B32B 27/36* (2006.01)

(52) U.S. Cl.
CPC . *B32B 2307/7246* (2013.01); *B32B 2307/734* (2013.01); *B32B 2367/00* (2013.01); *B32B 2553/00* (2013.01); *Y10T 428/31565* (2015.04); *Y10T 428/31681* (2015.04); *Y10T 428/31786* (2015.04)

(56) References Cited

U.S. PATENT DOCUMENTS

| | | | | |
|---|---|---|---|---|
| 5,770,301 | A * | 6/1998 | Murai | B32B 27/304 428/447 |
| 6,054,209 | A * | 4/2000 | Imanishi | B29D 7/01 525/437 |
| 6,361,856 | B1 * | 3/2002 | Wakai | B32B 27/306 428/483 |
| 6,534,137 | B1 * | 3/2003 | Vadhar | B32B 27/08 428/474.9 |
| 2002/0168515 | A1 * | 11/2002 | Murata | C08G 18/4241 428/343 |
| 2005/0078890 | A1 * | 4/2005 | Abe | H01L 25/0657 257/E29.022 |
| 2005/0100723 | A1 * | 5/2005 | Tanaka | B32B 27/08 428/458 |
| 2007/0160818 | A1 * | 7/2007 | Suzuki | C08J 5/18 428/480 |
| 2009/0035424 | A1 * | 2/2009 | Mita | B32B 27/36 426/118 |
| 2012/0208943 | A1 * | 8/2012 | Kojima | C08G 63/20 524/417 |
| 2018/0215090 | A1 * | 8/2018 | Kagawa | B29C 59/046 |
| 2019/0225745 | A1 * | 7/2019 | Sakano | C08G 63/676 |
| 2019/0389189 | A1 * | 12/2019 | Hayakawa | B32B 27/36 |
| 2022/0228978 | A1 * | 7/2022 | Kadoya | B32B 7/12 |

FOREIGN PATENT DOCUMENTS

| | | | |
|---|---|---|---|
| JP | 07-186318 | A | 7/1995 |
| JP | 08-118537 | A | 5/1996 |
| JP | 2002-105293 | A | 4/2002 |
| JP | 2003-205967 | A | 7/2003 |
| JP | 2004-284036 | A * | 10/2004 |
| JP | 2006-035646 | A * | 2/2006 |
| JP | 2006-175625 | A | 7/2006 |
| JP | 2015-066802 | A | 4/2015 |
| JP | 5933309 | B2 | 6/2016 |
| JP | 2017-165871 | A | 9/2017 |
| JP | 2017-178357 | A | 10/2017 |
| JP | 2019-038182 | A * | 3/2019 |
| WO | WO 01/10928 | A * | 2/2001 |
| WO | WO-2017/164190 | A1 | 9/2017 |

OTHER PUBLICATIONS

International Searching Authority, "International Search Report," issued in connection with International Patent Application No. PCT/JP2021/006124, dated Mar. 30, 2021.

International Searching Authority, "Written Opinion," issued in connection with International Patent Application No. PCT/JP2020/006124, dated Mar. 30, 2021.

Extended European Search Report issued in corresponding European Application No. 21760748.0 dated Jul. 4, 2023. (7 pages).

Office Action issued in corresponding Japanese Patent Application No. 2020-033186 dated Jan. 9, 2024 (8 pages).

Submission of Publications issued in corresponding Japanese Patent Application No. 2020-033186 dated Nov. 20, 2023 (18 pages).

* cited by examiner

LAMINATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/006124, filed on Feb. 18, 2021, which in turn claims the benefit of JP 2020-033186, filed Feb. 28, 2020 the disclosures of all which are incorporated herein by reference in its entirety.

TECHNICAL FIELD

The present invention relates to a laminate. More specifically, the present invention relates to a laminate for forming a packaging bag.

BACKGROUND ART

For example, as a packaging bag used for packaging food, a laminate (soft packaging material) including a biaxially oriented PET (polyethylene terephthalate) film and a polyolefin film is known (for example, PTLs 1 and 2). The biaxially oriented PET film is excellent in heat resistance and toughness as a base film. The polyolefin film such as polyethylene or polypropylene serves as a sealant layer.

CITATION LIST

Patent Literature

[PTL 1] JP 2017-178357 A;
[PTL 2] JP 5933309 B.

SUMMARY OF THE INVENTION

Technical Problem

Due to the spread of universal design, consideration for consumers is required also for packaging bags. For example, it is desired to use a laminate having easy tearing properties as a packaging bag that is easy to open. However, the laminate used in previous packaging bags still has room for improvement in easy tearing properties of the packaging bags.

The present invention was made in view of the above circumstances, and it is an object to provide a laminate having easy tearing properties.

Solution to Problem

The laminate for forming a packaging bag is provided with a substrate layer including a crystalline polyester film, an adhesive layer, and a sealant layer including the polyester film arranged in this order. In the laminate, the sealant layer has a ratio of a fracture elongation thereof to a thickness thereof which is 13%/μm or less. The fracture elongation is a fracture elongation of the sealant layer as measured in a unit of 15 mm width thereof in an MD direction.

The sealant layer may have a plane orientation coefficient of 0.08 or less.

The substrate layer may include a vapor-deposition layer of inorganic oxide on at least one surface of the substrate layer.

The laminate may have a water vapor permeability of 10 $g/m^2$/day or less.

The laminate may have an oxygen permeability of 5 $cc/m^2$/day or less.

The laminate may have a ratio of a total mass of a polyester component to a total mass of the laminate of 90 mass % or more.

Advantageous Effects of Invention

According to the present invention, a laminate having easy tearing properties can be provided.

BRIEF DESCRIPTION OF THE DRAWINGS

The Figure is a schematic cross-sectional view of a laminate according to an embodiment.

DETAILED DESCRIPTION

Figure 1:
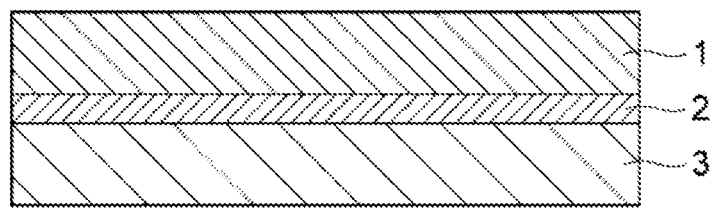

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

<Laminate>

The Figure is a schematic cross-sectional view of a laminate according to an embodiment. A laminate 10 according to an embodiment includes a substrate layer 1, an adhesive layer 2, and a sealant layer 3 arranged in this order.

[Substrate Layer]

The substrate layer is a film (base film) serving as a support and contains a crystalline polyester film. The substrate layer may be made of a crystalline polyester film. The crystalline polyester film may be a stretched film or a non-stretched film.

The crystalline polyester can be obtained, for example, by condensation polymerization of a diol and a dicarboxylic acid.

The diols include aliphatic diols and alicyclic diols, and include compounds such as ethylene glycol, diethylene glycol, triethylene glycol, 1,2-propylene glycol, 1,3-propylene glycol, dipropylene glycol, trimethylene glycol, tetramethylene glycol, pentamethylene glycol, hexamethylene glycol, octamethylene glycol, nonamethylene glycol, decamethylene glycol, neopentyl glycol, 1,4-butanediol, and 1,4-cyclohexanedimethanol. These compounds may be used singly or in combination of two or more. Ethylene glycol derived from biomass may also be used.

Examples of the dicarboxylic acids include aliphatic dicarboxylic acids, alicyclic dicarboxylic acids, and aromatic dicarboxylic acids, and include compounds such as oxalic acid, malonic acid, succinic acid, glutaric acid, adipic acid, pimelic acid, suberic acid, glutaconic acid, azelaic acid, sebacic acid, nonane dicarboxylic acid, decane dicarboxylic acid, undecane dicarboxylic acid, dodecane dicarboxylic acid, maleic acid, fumaric acid, mesaconic acid, citraconic acid, itaconic acid, isophthalic acid, terephthalic acid, n-dodecyl succinic acid, n-dodecenyl succinic acid, cyclohexane dicarboxylic acid, and anhydrides or lower alkyl esters of these acids. These compounds may be used singly or in combination of two or more.

As the crystalline polyester, polybutylene terephthalate, polybutylene naphthalate, polyethylene terephthalate or the like can be used from the viewpoint of fully developing the function as a substrate layer of the packaging material.

The substrate layer may contain recycled polyester from the perspective of reducing environmental impact. Examples of the recycled polyester include a chemically recycled polyester obtained by chemically recycling a container made of polyester mainly composed of ethylene terephthalate units, and a mechanically recycled polyester obtained by mechanically recycling a container made of polyester mainly composed of ethylene terephthalate units.

The substrate layer may be provided with a vapor-deposition layer of inorganic oxide on at least one surface of the base layer, for example from the viewpoint of improving gas barrier properties against water vapor and oxygen. The application of a vapor-deposition layer of inorganic oxide enables high barrier properties to be obtained with a very thin layer that does not affect the recyclability of the laminate. Examples of the inorganic oxide include aluminum oxide, silicon oxide, magnesium oxide, and tin oxide. From the viewpoint of transparency and barrier properties of the inorganic vapor-deposition layer, the inorganic oxide may be selected from the group consisting of aluminum oxide, silicon oxide, and magnesium oxide. The vapor-deposition layer of inorganic oxide may have a thickness of, for example, 5 nm or more and 100 nm or less, or 10 nm or more and 50 nm or less. A thickness of 5 nm or more facilitates good barrier properties, and a thickness of 100 nm or less facilitates maintaining the flexibility of the laminate.

The vapor-deposition layer can be formed, for example, by physical vapor deposition or chemical vapor deposition.

The substrate layer may include a film other than a crystalline polyester film, or may include a plurality of crystalline polyester films. When the substrate layer includes a plurality of crystalline polyester films, each of the crystalline polyester films may be the same or different.

When the substrate layer contains multiple layers of crystalline polyester film, at least one layer of polyester film may have a vapor-deposition layer of inorganic oxide on the surface of the vapor-deposition layer.

The thickness of the substrate layer is not limited, and may be, for example, in the range of 5 μm to 1 mm, or may be in the range of 5 to 800 μm, or alternatively, in the range of 5 to 500 μm. When the substrate layer includes a plurality of the above films, the total thickness thereof may be in the above range.

[Adhesive Layer]

The adhesive component of the adhesive layer may, for example, be a two-part curable polyurethane adhesive, in which a bifunctional or higher aromatic or aliphatic isocyanate compound as curing agent is reacted with a base resin, such as polyester polyol, polyether polyol, or acrylic polyol.

The adhesive layer can be formed by applying the adhesive component to the substrate layer, followed by drying. When a polyurethane adhesive is used, the polyurethane adhesive is applied to the substrate layer, followed by aging at 40° C. for 4 days or more, for example. This advances the reaction of the hydroxyl group of the base resin with the isocyanate group of the curing agent to achieve strong adhesion.

The adhesive layer may have a thickness in the range of 2 to 50 μm, or 3 to 20 μm, in terms of adhesion, followability, and processability.

[Sealant Layer]

The sealant layer imparts sealability to the laminate by heat sealing and includes a polyester film. The sealant layer may include a plurality of polyester films or may comprise a polyester film.

In the present embodiment, the sealant layer has a ratio of a fracture elongation thereof to a thickness thereof which is 13%/μm or less. The fracture elongation is a fracture elongation of the sealant layer as measured in a unit of 15 mm width thereof in an MD direction. The use of the sealant layer having the above value of 13%/μm or less allows elongation due to the viscosity of the resin to less likely occur when the laminate is torn, thereby suppressing the tear strength of the laminate. From such a viewpoint, the sealant layer may have a ratio of a fracture elongation thereof to a thickness thereof which is preferably 12%/μm or less, and more preferably 11%/μm or less. The fracture elongation is a fracture elongation of the sealant layer as measured in a unit of 15 mm width thereof in an MD direction. The minimum ratio of a fracture elongation thereof to a thickness thereof is not particularly limited, but may be, for example, 0.1%/μm or more. The fracture elongation is a fracture elongation of the sealant layer as measured in a unit of 15 mm width thereof in an MD direction.

The fracture elongation can be adjusted according to a material such as a film which forms the sealant layer, a stretch ratio during film formation, or the like. The stretch ratio during film formation may be appropriately changed depending on the material of the film or the like, but may be, for example, 1.1 times or more in the MD direction, and more specifically 1.5 times or more. The maximum stretch ratio is not particularly limited, and may be, for example, 6 times or less in the MD direction.

The plane orientation coefficient of the sealant layer is preferably 0.08 or less. Generally, films tend to tear easily in the orientation direction of the film, but not in directions other than the orientation direction of the film. Therefore, in the case of a laminate formed of two or more oriented films arbitrarily joined together, tearing inhibition may occur due to delamination of the films when tearing, resulting in a large rip in the laminate. The term "rip" refers to a phenomenon in which when two or more kinds of films are simultaneously torn from each other, the respective torn edges (tear lines) of the films are displaced from each other. If the plane orientation coefficient of the sealant layer is 0.08 or less, the influence of the orientation in the sealant layer is reduced when the laminate is torn, and the occurrence of a rip is suppressed. From this viewpoint, the plane orientation coefficient of the sealant layer is preferably 0.05 or less, and more preferably 0.01 or less. The lower limit of the plane orientation coefficient of the sealant layer is not particularly limited, but may be, for example, 0 or more, and more specifically 0.001 or more.

A polyester film contained in the sealant layer can be obtained by, for example, condensation polymerization of diols and dicarboxylic acids. Examples of the diol and the dicarboxylic acid include compounds exemplified in the substrate layer. The polyester film can be obtained, for example, by extruding a resin for forming the polyester film containing diols and dicarboxylic acids by a casting method or the like, and then stretching the resin in the film conveying direction at a desired stretch ratio.

Polybutylene terephthalate, polybutylene naphthalate, polyethylene terephthalate, or the like can be used as the polyester from the viewpoint of sufficiently developing the function as the sealant layer of the packaging material.

The sealant layer may contain a recycled polyester resin from the viewpoint of reducing environmental load. Examples of the recycled polyester resin include a chemically recycled polyester resin obtained by chemically recycling a container made of polyester resin mainly composed of ethylene terephthalate units, and a mechanically recycled polyester resin obtained by mechanically recycling a container made of polyester resin mainly composed of ethylene terephthalate units.

The polyester film constituting the sealant layer may be applied with various types of additives such as a flame retardant, a slip agent, an anti-blocking agent, an antioxidant, a light stabilizer, a tackifier and the like.

The sealant layer may have a thickness of 15 to 100 μm or 20 to 60 μm, in terms of seal strength. If the thickness of the sealant layer is less than 15 μm, the seal strength tends to be insufficient depending on the size of the laminate and the amount of contents. In addition, the mass ratio occupied by an adhesive or an ink in the laminate tends to be high. If the sealant layer includes a plurality of polyester films, the total thickness may be within the above range.

The water vapor permeability of the laminate is preferably, for example, 10 g/($m^2$ day) or less. The oxygen permeability of the laminate may be, for example, 5 cc/$m^2$ day or less. This protects the contents from deterioration due to steam or oxygen, and makes it easy to maintain the quality for a long time. From this viewpoint, the water vapor permeability may be 7.5 g/$m^2$ day or less, 5 g/$m^2$ day or less, 1 g/$m^2$ day or less, and 0.5 g/$m^2$ day or less. The oxygen permeability may be 4 cc/$m^2$ day or less, 3 cc/$m^2$ day or less, 0.5 cc/$m^2$ day or less, and 0.2 cc/$m^2$ day or less.

The laminate preferably has a polyester component as a main component. In other words, at least a part of the constituent film of the laminate is preferably a polyester film, and more preferably substantially all of the constituent film of the laminate is a polyester film. Such a laminate may be a laminate of substantially a single material (monomaterial), and packaging bags formed from the laminate are expected to have excellent recyclability. Here, the laminate mainly composed of the polyester component refers to a laminate in which the total mass of the polyester component exceeds 50 mass % based on the total mass of the laminate. From the viewpoint of recyclability, the total mass of the polyester component may be, for example, 60 mass % or more, 70 mass % or more, 80 mass % or more, 90 mass % or more, 92.5 mass % or more, or 95 mass % or more based on the total mass of the laminate.

Examples of the polyester component include a crystalline polyester film contained in the substrate layer described above and a polyester film contained in the sealant layer. Examples of components other than the polyester include an adhesive component or an ink component in the above adhesive layer.

The laminate can be suitably used to form a packaging bag for packaging contents. The contents include liquid seasonings, toiletries, soups, liquids such as liquid detergents, solids such as boiled foods, and solid-liquid mixtures of liquids and solids, such as curries. The laminate described above has easy tearing properties, and thus a packaging bag which can be easily opened can be formed.

The packaging bag is obtained by heat-sealing the sealant layers of the laminate facing each other. The packaging bag can be obtained, for example, by heat-sealing the three sides of the laminate with the sealant layers of the laminate facing each other. A package is obtained by filling the contents in the packaging bag and then sealing the packaging bag. The package can be obtained, for example, by filling the contents from the remaining side which is not heat-sealed, and then heat-sealing the remaining side.

EXAMPLES

While the present invention will be described in more detail using the following examples, it should be understood that the present invention is not limited to the following examples.

[Preparation of Polyester Film for Sealant Layer]

Resins 1 and 2 for forming polyester films were prepared using the monomers listed in Table 1 as starting materials. In the table, TPA is terephthalic acid, EG is ethylene glycol, NPG is neopentyl glycol, BDO is 1,4-butanediol, DEG is diethylene glycol, and CHDM is 1,4-cyclohexanedimethanol. The units in the table represent mol %.

TABLE 1

| | Carboxylic acid component | Diol component | | | | |
|---|---|---|---|---|---|---|
| | TPA | EG | NPG | BDO | DEG | CHDM |
| Resin 1 | 100 | 70 | 19 | 9 | 2 | — |
| Resin 2 | 100 | 60 | — | — | 5 | 35 |

Polyester film A:

The resin 1 thus obtained was extruded by the casting method and then stretched in the film conveying direction (hereinafter referred to as "MD") at a stretch ratio of 2 times to obtain a polyester film A. The thickness after stretching was 30 μm.

Polyester film B:

The polyester film B was obtained in a manner similar to the polyester film A, except that the stretch ratio was 1.1 times. The thickness after stretching was 30 μm.

Polyester film C:

A polyester film C was obtained in a manner similar to the polyester film A, except that the thickness after stretching was 50 μm.

Polyester film D:

A polyester film D was obtained in a manner similar to the polyester film A, except that the stretch ratio was 3 times. The thickness after stretching was 30 μm.

Polyester film E:

A polyester film E was obtained in a manner similar to the polyester film B, except that the resin 1 was changed to resin 2.

The thickness after stretching was 30 μm.

(Measurement of Fracture Elongation of Polyester Film)

Fracture elongation in the MD direction of polyester film was measured in accordance with JIS K 7127. The width of a specimen was 15 mm, the initial distance between chucks was 100 mm, and the test speed was 300 mm/min.

(Measurement of Plane Orientation Coefficient of Polyester Film)

The plane orientation coefficient of the polyester film was measured and calculated as follows. First, the refractive index was measured in accordance with JIS K 7142 "Plastics-Determination of refractive index" (Method A). A KOBRA-WR manufactured by Oji Scientific Instruments Co., Ltd. was used as the measuring instrument. The refractive index (nx) in the longitudinal direction of the film, the refractive index (ny) in the width direction of the film, and the refractive index (nz) in the thickness direction of the film were measured, and the plane orientation coefficient (ΔP) was calculated by the following equation.

$$\Delta P = (nx+ny)/2 - nz$$

[Preparation of Laminate]

Example 1

A stretched PET film having a thickness of 12 μm, which is a crystalline polyester film and oriented in a direction of 30 degrees with respect to the MD direction, was prepared as a base film. Then, the stretched PET film and the polyester film A were bonded together by a dry lamination method to obtain a laminate. A common urethane resin adhesive was used as the adhesive for dry lamination. The coating amount of the urethane resin adhesive after drying was adjusted to 3 g/m² (3 μm in thickness).

Example 2

A laminate was obtained in a manner similar to Example 1, except that a polyester film B was used instead of the polyester film A.

Example 3

A laminate was obtained in a manner similar to Example 1, except that a polyester film C was used instead of the polyester film A.

Example 4

A laminate was obtained in a manner similar to Example 1, except that a polyester film D was used instead of the polyester film A.

Example 5

A laminate was obtained in a manner similar to Example 1, except that a polyester film E was used instead of the polyester film A.

Example 6

A laminate was obtained in the manner similar to Example 1, except that a silica-deposited film was provided as a barrier layer on one surface of the stretched PET film as the base film, and the silica deposited side of the barrier film and the polyester film A were laminated by the dry lamination method.

Example 7

A laminate was obtained in a manner similar to Example 6, except that the base film was replaced with a stretched PET film (trade name: "EMBLET PC", manufactured by UNITIKA LTD.) which is a crystalline polyester film.

Example 8

A laminated body was obtained in the same manner as in Example 6, except that a stretched PET film having a thickness of 12 μm, which is a crystalline polyester film, was further laminated on the barrier film, and the coating amount of the urethane resin adhesive after drying was adjusted to 4 g/m² (4 μm in thickness). The above urethane resin adhesive was also used in the lamination of the stretched PET film, and the amount of the adhesive applied after drying was adjusted to 4 g/m² (4 μm in thickness).

Comparative Example 1

A laminate was obtained in a manner similar to Example 1, except that a polyester film G-13 (manufactured by Kurabo Industries Ltd.) having a thickness of 30 μm was used instead of the polyester film A.

Comparative Example 2

A laminate was obtained in a manner similar to Example 1, except that a polypropylene film ZK207 (manufactured by Toray Advanced Film Co., Ltd) having a thickness of 60 μm was used instead of the polyester film A.

Comparative Example 3

A laminate was obtained in a manner similar to Example 7, except that a polyester film G-13 (manufactured by Kurabo Industries Ltd.) having a thickness of 30 μm was used instead of the polyester film A.

[Evaluations]

The obtained laminate was evaluated. The results are shown in Tables 2 and 3.

(Tear strength measurement)

Tear strength in the MD direction of the laminate was measured in accordance with the Trouser tear method described in JIS K 7128.

(Measurement of rip width)

A sample was prepared by cutting two 90-mm square pieces of laminate, placing the sealant layers face to face and sealing three outer edges, filling them with 30 ml of water, and then sealing the remaining one edge. The sealing conditions were a pressure of 0.2 MPa, temperature of 190° C., and 1 second duration. The width of the seal was 5 mm from the outer circumference.

The prepared sample was torn open in the MD direction by hand by a tester, and the amount of displacement between the torn edge of the front sheet and the torn edge of the back sheet among the sheets that overlapped each other (hereinafter referred to as "step") was measured. The step was measured by applying a scale in a direction perpendicular to the tearing direction. The maximum value of the step created along the opening line was used as the measured value of the rip width.

(Measurement of oxygen permeability and water vapor permeability)

Oxygen permeability and water vapor permeability of the laminate were measured in accordance with JIS K 7126B.

(Measurement of mass ratio of polyester components)

The mass ratio of the polyester component (polyester film) was calculated based on the total mass of the material forming the laminate.

TABLE 3-continued

|  | Comparative Example 1 | Comparative Example 2 | Comparative Example 3 |
|---|---|---|---|
| Tear strength (N) | 6.1 | 1.2 | 5.9 |
| Rip width (mm) | —*1 | 19 | —*1 |
| Oxygen permeability (cc/m²/day) | 100 | 100 | 0.2 |
| Water vapor permeability (cc/m²/day) | 50 | 50 | 0.5 |
| Polyester component (%) | 95 | 22.8 | 95 |

*1Unable to measure due to unopening

INDUSTRIAL APPLICABILITY

The laminate according to the present invention has excellent tearing properties as a packaging material. Substantially all the constituent films can be polyester films. Such a laminate may be a packaging material made of a single material (monomaterial), and excellent recyclability is expected.

REFERENCE SIGNS LIST

1 . . . Substrate layer; 2 . . . Adhesive layer; 3 . . . Sealant layer; 10 . . . Laminate.

TABLE 2

|  |  | Example 1 | Example 2 | Example 3 | Example 4 | Example 5 | Example 6 | Example 7 | Example 8 |
|---|---|---|---|---|---|---|---|---|---|
| Substrate layer | Type (Thickness (μm)) | PET (12) | PET (12) | PET (12) | PET (12) | PET (12) | Inorganic deposition PET (12) | Inorganic deposition PET (12) | PET (12) Inorganic deposition PET (12) |
| Adhesive layer | Thickness (μm) | 3 | 3 | 3 | 3 | 3 | 3 | 3 | 4 |
| Sealant layer | Film type (Thickness (μm)) | A (30) | B (30) | C (50) | D (30) | E (30) | A (30) | A (30) | A (30) |
|  | Fracture elongation/Thickness (%/μm) | 6.7 | 11 | 6.9 | 5 | 10 | 6.7 | 6.7 | 6.7 |
|  | Plane orientation coefficient | 0.08 | 0.007 | 0.08 | 0.1 | 0.003 | 0.08 | 0.08 | 0.08 |
| Tear strength (N) |  | 0.3 | 0.4 | 0.3 | 0.2 | 0.5 | 0.3 | 0.2 | 0.6 |
| Rip width (mm) |  | 16 | 10 | 19 | 22 | 7 | 16 | 3 | 18 |
| Oxygen permeability (cc/m²/day) |  | 100 | 100 | 100 | 100 | 100 | 0.2 | 0.2 | 0.2 |
| Water vapor permeability (cc/m²/day) |  | 50 | 50 | 50 | 50 | 50 | 0.5 | 0.5 | 0.5 |
| Polyester component (%) |  | 95 | 95 | 96.7 | 95 | 95 | 95 | 95 | 86 |

TABLE 3

|  |  | Comparative Example 1 | Comparative Example 2 | Comparative Example 3 |
|---|---|---|---|---|
| Substrate layer | Type (Thickness (μm)) | PET (12) | PET (12) | Inorganic deposition PET (12) |
| Adhesive layer | Thickness (μm) | 3 | 3 | 3 |
| Sealant layer | Film type (Thickness (μm)) | G-13 (30) | ZK207 (60) | G-13 (30) |
|  | Fracture elongation/Thickness (%/μm) | 30< | 15 | 30< |
|  | Plane orientation coefficient | 0.09 | 0.07 | 0.09 |

What is claimed is:

1. A laminate for forming a packaging bag, consisting of:
a substrate layer consisting of (a) a stretched crystalline polyester film consisting of polyethylene terephthalate, (b) a polyurethane resin adhesive layer in direct contact with the crystalline polyester film, and (c) a sealant layer consisting of a polyester film, which is in direct contact with the adhesive layer, wherein
the polyester film of the sealant layer consists of a polyester obtained by condensation polymerization of a terephthalic acid and two or more diols;
the two or more diols comprise ethylene glycol and one or more additional diols selected from the group consisting of neopentyl glycol, 1,4-butanediol, diethylene glycol and 1,4-cyclohexanedimethanol;
the polyester film of the sealant layer has a stretch ratio in an MD direction from 1.1 to 3.0;

the sealant layer has a ratio of a fracture elongation thereof to a thickness thereof which is 13%/μm or less, the fracture elongation being a fracture elongation of the sealant layer as measured in a unit of 15 mm width thereof in the MD direction, wherein the substrate layer is an outermost layer of the laminate and a tear strength of the laminate from 0.2 N to 0.6 N.

2. The laminate of claim 1, wherein the sealant layer has a plane orientation coefficient of 0.08 or less.

3. The laminate of claim 1, wherein the laminate has a water vapor permeability of 10 g/m$^2$ day or less.

4. The laminate of claim 1, wherein the laminate has an oxygen permeability of 5 cc/m$^2$ day or less.

5. The laminate of claim 1, wherein a ratio of a total mass of all polyester material in the laminate to a total mass of the laminate is 90 mass % or more.

6. A laminate for forming a packaging bag, consisting of:
(a) a substrate layer consisting of a stretched crystalline polyester film consisting of polyethylene terephthalate, (b) a vapor deposited layer of inorganic oxide on the crystalline polyester film, (c) a polyurethane resin adhesive layer in direct contact with the vapor deposited layer, and (c) a sealant layer containing a polyester film, which is in direct contact with the polyurethane resin adhesive layer, wherein the polyurethane resin adhesive layer consists of polyurethane resin adhesive;

the polyester film of the sealant layer consists of a polyester obtained by condensation polymerization of a terephthalic acid and two or more diols;

the two or more diols comprise ethylene glycol and one or more additional diols selected from the group consisting of neopentyl glycol, 1,4-butanediol, diethylene glycol and 1,4-cyclohexanedimethanol;

the polyester film of the sealant layer has a stretch ratio in an MD direction from 1.1 to 3.0;

the sealant layer has a ratio of a fracture elongation thereof to a thickness thereof which is 13%/μm or less, the fracture elongation being a fracture elongation of the sealant layer as measured in a unit of 15 mm width thereof in an MD direction, wherein the substrate layer is an outermost layer of the laminate and a tear strength of the laminate from 0.2 N to 0.6 N.

7. The laminate of claim 6, wherein the sealant layer has a plane orientation coefficient of 0.08 or less.

8. The laminate of claim 6, wherein the laminate has a water vapor permeability of 10 g/m$^2$ day or less.

9. The laminate of claim 6, wherein the laminate has an oxygen permeability of 5 cc/m$^2$ day or less.

10. The laminate of claim 6, wherein a ratio of a total mass of all polyester material in the laminate to a total mass of the laminate is 90 mass % or more.

* * * * *